(12) United States Patent
Porumamilla et al.

(10) Patent No.: US 8,302,944 B1
(45) Date of Patent: Nov. 6, 2012

(54) PNEUMATIC VIBRATION ISOLATION DEVICE

(75) Inventors: Hemanth Porumamilla, Atascadero, CA (US); Jerald M. Vogel, Ames, IA (US); Atul G. Kelkar, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1148 days.

(21) Appl. No.: 12/173,063

(22) Filed: Jul. 15, 2008

Related U.S. Application Data

(60) Provisional application No. 60/950,272, filed on Jul. 17, 2007.

(51) Int. Cl.
*F16F 9/342* (2006.01)

(52) U.S. Cl. ............... 267/64.18; 267/64.23; 267/64.26; 267/64.28

(58) Field of Classification Search ............... 267/64.18, 267/64.19, 64.21, 64.22, 64.23, 64.25, 64.26, 267/64.27, 64.28
See application file for complete search history.

(56) References Cited

U.S. PATENT DOCUMENTS

| | | | |
|---|---|---|---|
| 3,822,908 A | 7/1974 | Gouirand | |
| 4,415,179 A | 11/1983 | Marinelli | |
| 4,497,078 A | 2/1985 | Vogel et al. | |
| 4,669,710 A * | 6/1987 | Horvat | 267/64.21 |
| 4,733,876 A | 3/1988 | Heider et al. | |
| 4,923,210 A | 5/1990 | Heider et al. | |
| 5,083,812 A | 1/1992 | Wallace et al. | |
| 5,265,907 A | 11/1993 | Tostado | |
| 5,346,246 A | 9/1994 | Lander et al. | |
| 5,413,316 A * | 5/1995 | Easter | 267/64.24 |
| 5,584,497 A | 12/1996 | Lander et al. | |
| 5,765,859 A | 6/1998 | Nowell et al. | |
| 5,908,198 A | 6/1999 | VanDenberg | |
| 5,921,532 A * | 7/1999 | Pierce et al. | 267/64.19 |
| 5,988,672 A | 11/1999 | VanDenberg | |
| 6,102,378 A * | 8/2000 | Gieseler et al. | 267/34 |
| 6,402,128 B1 * | 6/2002 | Trowbridge | 267/64.21 |
| 6,644,632 B1 * | 11/2003 | Jaberg | 267/64.21 |
| 6,725,983 B2 | 4/2004 | Bell | |
| 6,733,022 B2 | 5/2004 | Bradshaw et al. | |
| 6,824,146 B2 * | 11/2004 | Kang | 280/6.159 |
| 7,083,163 B2 * | 8/2006 | Lemmens et al. | 267/64.24 |
| 2004/0061293 A1 | 4/2004 | Barbison | |
| 2004/0178587 A1 | 9/2004 | Hiebert et al. | |
| 2005/0098399 A1 | 5/2005 | Bremner | |

OTHER PUBLICATIONS

Hemanth Porumamilla, Modeling, Analysis and Non-Linear Control of a Novel Pneumatic Semi-Active Vibration Isolator: A Concept Validation Study, Thesis, Aug. 17, 2007, 161 pages.
U.S. Appl. No. 12/330,843, filed Dec. 9, 2008, Vogel et al.
U.S. Appl. No. 11/187,366, filed Jul. 23, 2004, Kelkar et al.

* cited by examiner

*Primary Examiner* — Bradley King
(74) *Attorney, Agent, or Firm* — Reinhart Boerner Van Deuren P.C.

(57) ABSTRACT

An apparatus that prevents collapse mode and sling-shot mode of the accumulated air spring vibration isolation system is presented. The apparatus is contained in an air spring which is connected to accumulator. The apparatus blocks air flow to the accumulator when the air spring is attempting to bottom out, resulting in a soft pneumatic stop for the suspended mass. High pressure air within the air spring at its lowest height is evacuated to the accumulator, thus precluding a "sling shot" reaction of the suspended mass. The apparatus incorporates a double acting air cylinder with an orifice disk attached to a piston shaft end and an orifice contained within the air spring head. The upper air cylinder volume is vented to the air spring interior compartment through an unrestrictive orifice and the lower air cylinder volume is vented to the high pressure source through a highly restrictive orifice.

11 Claims, 8 Drawing Sheets

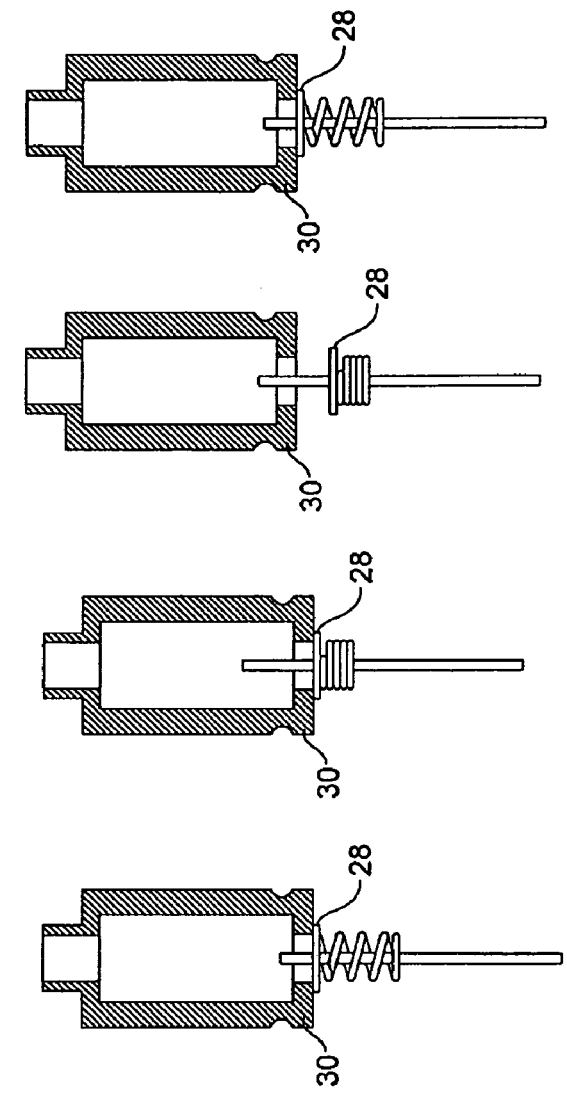
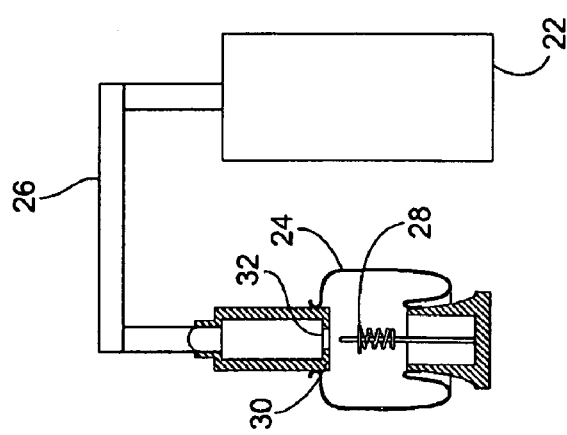
FIG. 3a  FIG. 3b  FIG. 3c  FIG. 3d
FIG. 2

PNEUMATIC VIBRATION ISOLATION DEVICE

CROSS-REFERENCE TO RELATED PATENT APPLICATIONS

This patent application claims the benefit of U.S. Provisional Patent Application No. 60/950,272, filed Jul. 17, 2007, the teachings and disclosure of which are incorporated herein in their entireties by reference thereto.

BACKGROUND

Whole-body vibration is a physical occupational hazard in many workplaces. Additionally, the mobility impaired who must rely on a wheelchair mode of transportation are also subject to this type of vibration. Workers typically subjected to this type vibration are operators or drivers of numerous kinds of vehicles used in agriculture, construction, highway trucking, and utility industries. Operators of the vehicles/equipment used in these industries are often subjected to extreme vibration environments for extended durations of time.

The contemporary suspensions used on these vehicles are generally inadequate in providing the necessary vibration isolation for the operator. For example, a recent exhaustive road test study of a series of seven utility truck/trailer configurations having contemporary suspensions was tested. Data were reduced per an accepted standard to measure whole-body vibration (i.e. ISO 2631 guide-lines) yielding health and comfort indices for each configuration. The health index for virtually all truck configurations was observed to approach or extend into the "health caution zone" whereby health problem occurrences have been documented.

In addition to the failure of current pneumatic suspension to adequately isolate vibrations from the occupant, many such suspensions are subject to occasional bottoming out and sling shot effects. The phrase bottoming out refers to the situation when the suspension is fully compressed due, e.g., to a bump, and it hits its mechanical stop or limit. Such a situation results in a large jolt to the occupant, subjecting him/her to a high G force. The phrase sling shot refers to the situation when the encounters an upward force, e.g. from a bump, when the suspension is already compressed that results in the suspension rebounding from a compressed state beyond its quiescent position, subjecting the occupant to high upward acceleration and travel.

In view of these problems, there is a need in the art for a vibration isolation device that can adequately provide the necessary vibration isolation for the operator and prevent or minimize the occurrences of bottoming out and/or sling shot events. Embodiments of the system of the present invention provide such a vibration isolation device.

SUMMARY

In view of the above, embodiments of the present invention provide a new and improved vibration isolation system that overcome one or more of the problems existing in the art. More particularly, embodiments of the present invention provide a new and improved vibration isolation system that provides adequate vibration isolation that does not suffer from bottoming out events and/or sling shot events. Such embodiments significantly improve the performance of a pneumatic isolation device which is used to mitigate the transmission of vibration from unsprung mass to sprung mass. Such embodiments are relatively easy to manufacture and are low cost. Embodiments of the present invention are particularly effective at controlling over-compression and over-extension modes of motion.

In one embodiment, the apparatus is a device that incorporates a double acting air cylinder. At one end of the cylinder shaft, an orifice disk is attached whose function is to engage a sharp edged orifice in the air spring head to control flow from air spring to accumulator. The upper volume of the air cylinder is vented to the air spring interior compartment through an unrestrictive orifice and the lower volume is vented to a high pressure source through a highly restrictive orifice. One function of the apparatus is to block air flow to the accumulator when the air spring is attempting to bottom out, thus causing a soft pneumatic stop for the suspended mass. A second function of the device is to allow the high pressure air within the air spring near its lowest height to be evacuated to the accumulator by pulling the orifice disk from the sharp edged orifice, thus precluding a sling shot reaction of the suspended mass.

Other aspects, objectives and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a simplified block diagram illustrating several components of the pneumatic vibration isolation device;

FIGS. 3a-3d are diagrams illustrating the basic functionality of the pneumatic vibration isolation device;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Embodiments of the present invention described herein provide a low-cost passive valve mechanism used to control over-compression and over-extension modes of motion of a sprung mass such as a seat in a vehicle, a wheelchair, and the like.

Figures 1A, 1B:
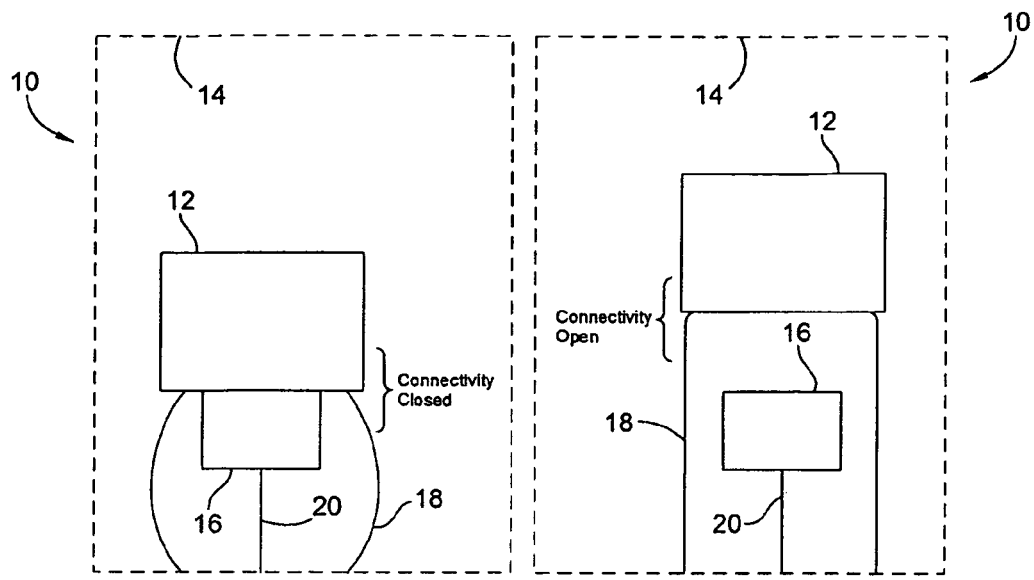
FIGS. 1a-1b are block diagrams of an exemplary environment in which the pneumatic vibration isolation device operates.

Turning now to the drawings, wherein like reference numerals refer to like elements, an embodiment an apparatus constructed in accordance with the teachings of the present invention is illustrated as being implemented in a suitable environment. FIGS. 1a and 1b illustrate an environment 10, e.g. an over-the-road truck, in which a sprung mass 12, e.g. a driver, is connected to an unsprung mass object 14, e.g. the truck cab, via a pneumatic isolator 18. The apparatus 16 is attached to the unsprung mass 14 via mounting mechanism 20. The mounting mechanism 20 may be a platform, bracket, cantilever, etc. The connectivity between sprung mass 12 and apparatus 18 is bi-modal, to with, open or closed.

Embodiments of an apparatus constructed in accordance with the teachings of the present invention allow a low natural frequency pneumatic isolator to have recovery modes of motion (pneumatic stop) that prevent air spring compression stroke collapse (bottoming out) and an excessive over-extension stroke (sling-shot) of the air spring.

Prior to a more detailed description of the apparatus, a brief overview of operation is in order. Note that a mechanical spring shall be used for the purposes of illustrating the concept behind the apparatus' functionality in FIGS. 2 and 3a-3d. In actual embodiments, the apparatus uses a pneumatic cylinder to achieve the functionality of the mechanical spring shown in these figures.

Turning now to FIG. 2, the pneumatic vibration isolator includes an accumulator 22 connected to an air spring assembly 24 via supply line 26. The apparatus provides a gradual pneumatic stop for the collapsing air spring in those instances wherein the suspended mass would otherwise "bottom out" thus providing a soft arresting motion of the suspended mass.

FIGS. 3a-3d illustrate the basic functionality of the apparatus. A sliding orifice disk 28 (i.e., a shut-off disk) is placed on a shaft inside the air spring assembly 24 and positioned along the shaft at a vertical position that represents the incipient collapse condition for the air spring assembly 24 (see FIG. 3a). That is, when the air spring head 30 moves down through this vertical location, air spring assembly 24 collapse is eminent. The disk 28 is held in place by means of a vertical shaft/spring mechanism combination. At air spring assembly 24 height conditions less than the critical value and for downward motion states, the accumulator 22 is isolated from the air spring assembly 24 by virtue of the orifice disk 28 closing the sharp edged orifice 32, thus allowing the air cylinder pressure to rapidly grow to pneumatic stop values (see FIG. 3b). When the air spring assembly 24 rebounds from its arrested position, the orifice disk 28 disengages from the sharp edged orifice 32 thus allowing the high pressure air mass in the air spring assembly 24 to escape to the accumulator 22 (see FIG. 3c). The corresponding rapid drop in air spring pressure precludes a "sling shot" reaction whereby the air spring assembly 24 rapidly accelerates the suspended mass to a hard stop condition at the air cylinder maximum extension state. The orifice disk 28 then returns to its equilibrium position ready for subsequent perturbations (see FIG. 3d).

Figure 4:
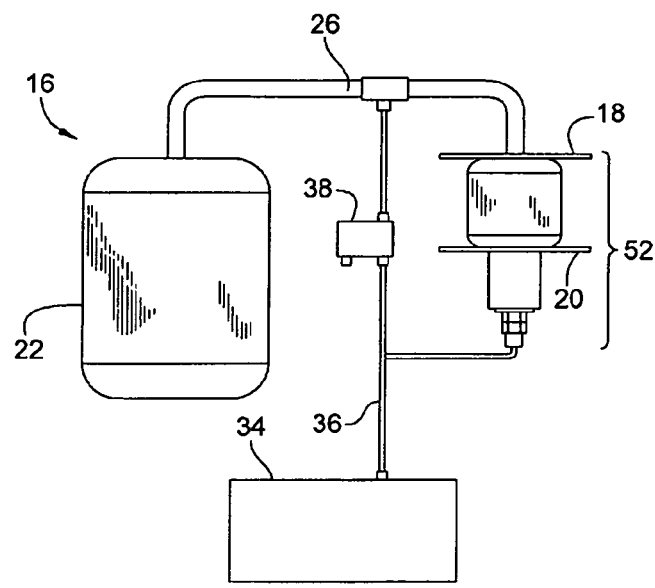
FIG. 4 is an isometric view of an embodiment of the pneumatic vibration isolation device.

Now that a brief overview of operation has been described, further details of the apparatus shall be described. Turning now to FIG. 4, the air spring assembly is attached to the sprung mass via a mounting mechanism 18 and to unsprung mass via mounting mechanism 20. The mounting mechanisms 18, 20 should have sufficient stiffness to hold the sprung mass. The air spring assembly also includes a pneumatic cylinder assembly 52 that will be discussed in detail below. High pressure source 34 provides high pressure gas (e.g., air) to air cylinder via supply line 36 and to the accumulator 22 via supply line 36 and height control valve 38. The height control valve 38 keeps the sprung mass within a desired range.

Figure 5:
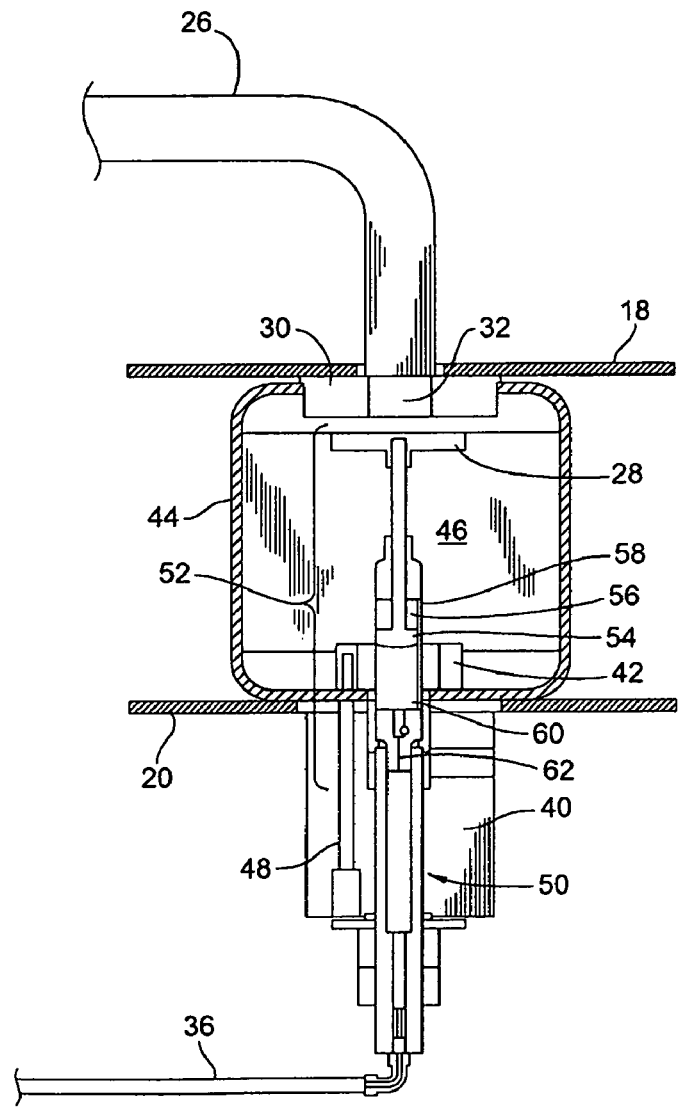
FIG. 5 is a cross-sectional view of the air spring assembly of FIG. 4.

Turning now to FIG. 5, an embodiment of the air spring assembly is illustrated. The air-spring assembly includes a base 40 having a base cap 42, an air spring sleeve 44, and top cap 30 that has an orifice 32. The base 40, sleeve 44, and top cap 30 form an interior air spring compartment 46. The mounting mechanism 18 is attached to top cap 30 and mounting mechanism 20 is attached to base 40. As a result, when the top cap 30 moves, the sprung mass moves and vice versa. The base cap 42 is connected to base 40 via fastener(s) 48.

The pneumatic cylinder assembly 52 contains two cylindrical volumes, the upper volume 56 and the lower volume 60. These volumes 56, 60 are separated by a cylinder piston 54 that is attached to the orifice disk/shaft 28. The upper volume 56 is vented to the interior air spring compartment 46 through a nonrestrictive orifice 58 and maintains a pressure equal to the air spring pressure throughout the stroke of the pneumatic cylinder assembly 52. The lower volume 60 is vented to the high pressure source via supply line 36 through a highly restrictive orifice 62 which slowly meters air flow to and from the lower cylinder/high pressure source combination.

During an air spring down stroke with sufficient potential to cause an air spring collapse condition, the sharp edged orifice 32 surface contacts the orifice disk 28 when the top cap 30 reaches the critical height. At this point the accumulator is isolated and the air spring is placed in a state of rapid internal pressure buildup as the downward motion continues. During this process the lower volume 60 in the air cylinder is compressed to a pressure in excess of the high pressure source, thus causing flow from the lower volume 60 through the small orifice 62 to the high pressure source via supply line 36.

Upon reaching a state of pneumatic stop, the air spring begins to rebound with the orifice disk 28 intact with the sharp edged orifice 32. The air pressure in the lower volume 60 of the air cylinder rapidly decreases culminating in a suction force that pulls the orifice disk 28 from the sharp edged orifice 32, thus releasing the high pressure mass of air within the air spring compartment 46 to the accumulator via air supply line 26. Hence the large pressure force that would otherwise "sling shot" the suspended mass to an excessive height is minimized, allowing the suspended mass to slowly return to its design height region. The restrictive orifice 62 in the air cylinder lower volume 60 slowly bleeds air from the high pressure source, thus allowing the orifice disk 28 to return to its critical height state.

This operation of the pneumatic vibration isolator may also be described in two thermodynamic cycles. The two cycles are air spring/accumulator cycle and shut-off disk/pneumatic cylinder cycle.

The air spring/accumulator cycle begins with a normal compression stroke driven by the sprung mass 12. At this position, the isolation is at maximum due to the lowest system natural frequency provided by means of the combined volumes of the accumulator 22, air supply line 26, and the air spring assembly 24.

As the sprung mass 12 travels through the mid-compression stroke, the air spring top cap 30 is driven into contact with the shut-off disk 28 at a predetermined air spring height. The height is adjusted via pneumatic cylinder adjustment mechanism 50. The air flow between the accumulator 22 and air spring assembly 24 becomes blocked when the air flow passage of the supply line 26 is blocked as a result of the contact with the shut-off disk 28. The result of the sealed-off air flow passage is a high compression rate within the air spring assembly 24 which forces the air spring assembly 24 into a state of maximum stiffness, and thereby creates a pneumatic stop for the sprung mass. The pneumatic stop prevents any further travel through the compression stroke, and forces the system through a point of velocity reversal of the sprung mass and into an expansion stroke.

As the system begins the expansion stroke, the air spring top cap 30 and shut-off disk 28 remain in contact, causing a state of stiff expansion of the air spring assembly 24. As the system continues to travel through the expansion stroke, the shut-off disk 28 separates from the air spring top cap 30 and releases the contained high pressure air from within the air spring assembly 24 into accumulator 22 through supply line 26. The immediate release of the high pressure air forces the sprung mass system into a normal expansion stroke. As the sprung mass system continues through the expansion stroke, the air spring assembly 24 reaches a point of maximum extension, and thus forces the sprung mass system into a second point of velocity reversal. As the system transitions through the velocity reversal and into the normal compression stroke, the cycle is repeated.

The shut-off disk/pneumatic cylinder cycle begins when the air spring top cap 30 is driven into contact with the shut-off disk 28. Prior to any contact, the shut-off disk 28 is held in position by means of the pneumatic cylinder assembly 52 being held in its fully extended state. The full extension position of the pneumatic cylinder assembly 52 is a result of the high pressure air from the high pressure source 34 entering the pneumatic cylinder assembly 52 via the high pressure supply line 36, and supplied across the face of the pneumatic cylinder piston 54.

Upon contact of the shut-off disk 28 and the air spring top cap 30, the pneumatic cylinder assembly 52 begins the down stroke cycle. The pneumatic cylinder upper volume compression path is created by the contact (of the spring top cap 30 and shut-off disk 28), as well as the pressurization from the air mass flow from within the air spring to the pneumatic cylinder upper volume 56, through the air flow passage of the pneumatic cylinder upper volume port 58. The free flow of air between the pneumatic cylinder upper volume 56 and pressurized air contained within the air spring assembly 24, allows for the same air pressure at both locations. Additionally, as the down stroke begins, the pneumatic cylinder piston 54 compresses the pneumatic cylinder lower volume 60 to the lowest position of the down stroke. The pressure within the pneumatic cylinder lower volume 60 is the same pressure as the high pressure source. The lowest down stroke position is the same as the relative position as the velocity reversal position of the sprung mass system of accumulator/air spring cycle. Furthermore, as a direct function of the compressive travel distance of the air spring assembly 24, the pneumatic cylinder assembly 52 may or may not reach its fully retracted (compressed) state.

As the sprung mass system transitions through the velocity reversal and into the extension mode, the pneumatic cylinder assembly 52 begins an upstroke state or extension mode as well. As the extension mode begins, the pneumatic cylinder upper volume 56 follows the pressure level contained within the air spring assembly 24. However, the pneumatic cylinder lower volume 60 experiences a rapid pressure decrease. The rapid pressure decrease is caused by the cylinder orifice 62 which restricts the air flow from high pressure source 28. The resulting pressure differential across the pneumatic cylinder piston 54 forces the pneumatic cylinder assembly 52 to travel through a segment of the upstroke at a velocity lower than that of the sprung mass system thus creating separation of sharp edge orifice surface 32 from shut-off disk 28. Once the upstroke has reached the fully extended position of the pneumatic cylinder assembly 52, the cycle is repeated when contact occurs between the shut-off disk 28 and the air spring top cap 30.

Now that the functionality of the apparatus has been described, experimental results shall be described. The test set-up consisted of a shaker table, a data acquisition system, a prototype of the pneumatic vibration isolator, and vibration environment simulation data files. The vibration environment simulation data files have typical vibration profiles operators of agriculture, construction, highway trucking, utility industries, etc. are subjected to during operation.

Figure 6:
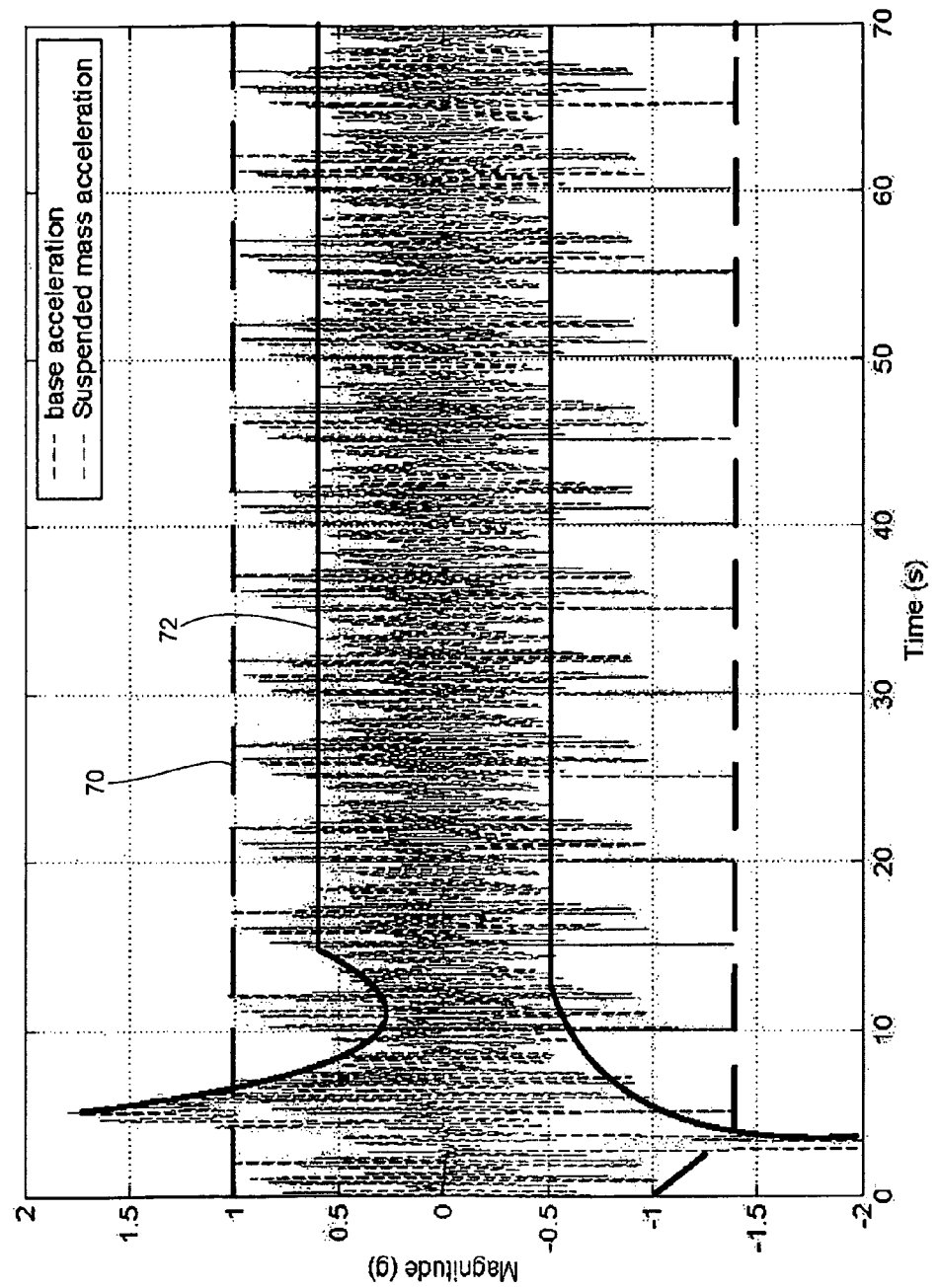
FIG. 6 is a graph illustrating a response of a test system with an un-accumulated air spring and no catch mechanism.
Figure 7:
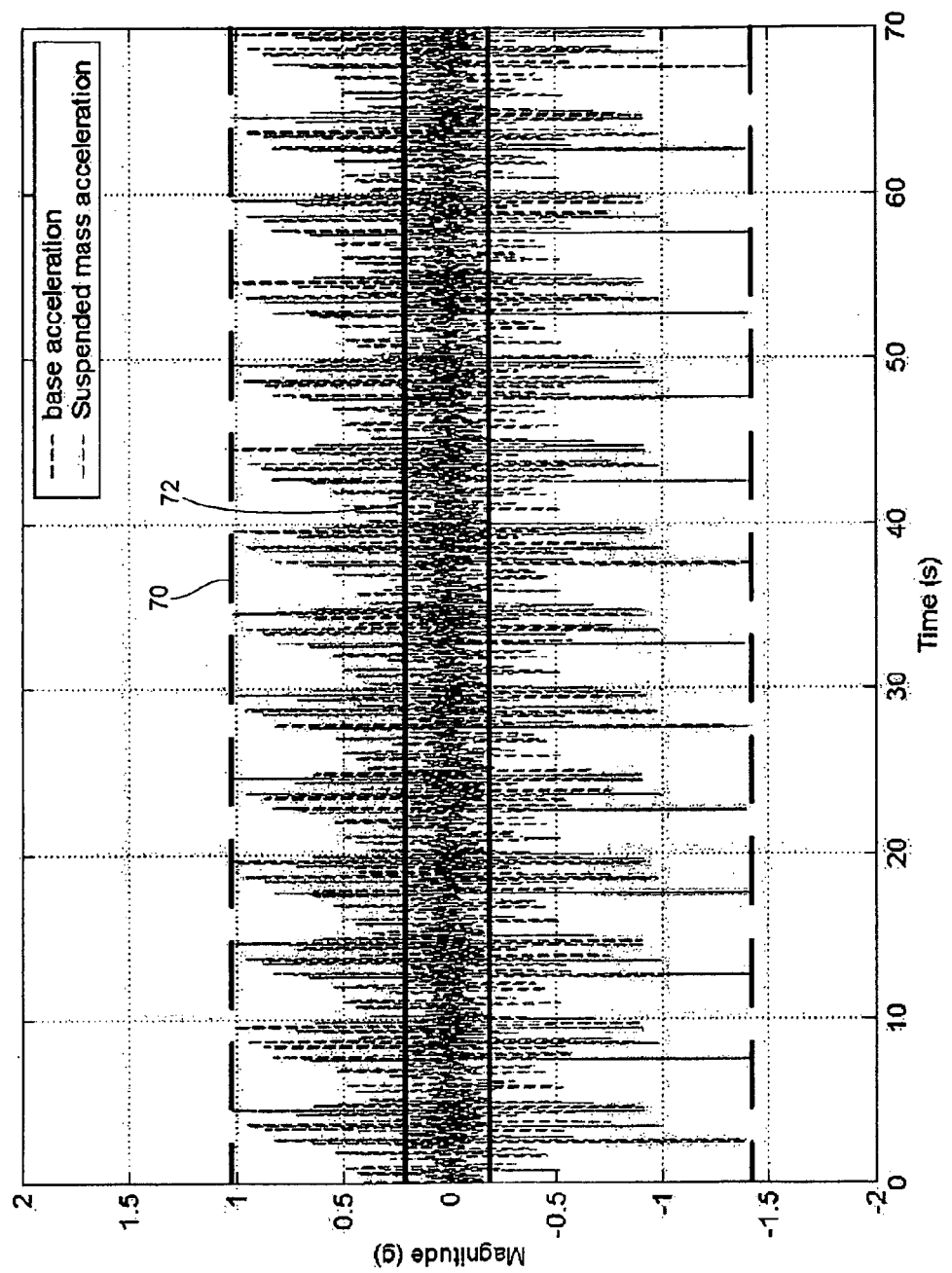
FIG. 7 is a graph illustrating a response of the test system with an accumulated air spring and no catch mechanism.
Figure 8:
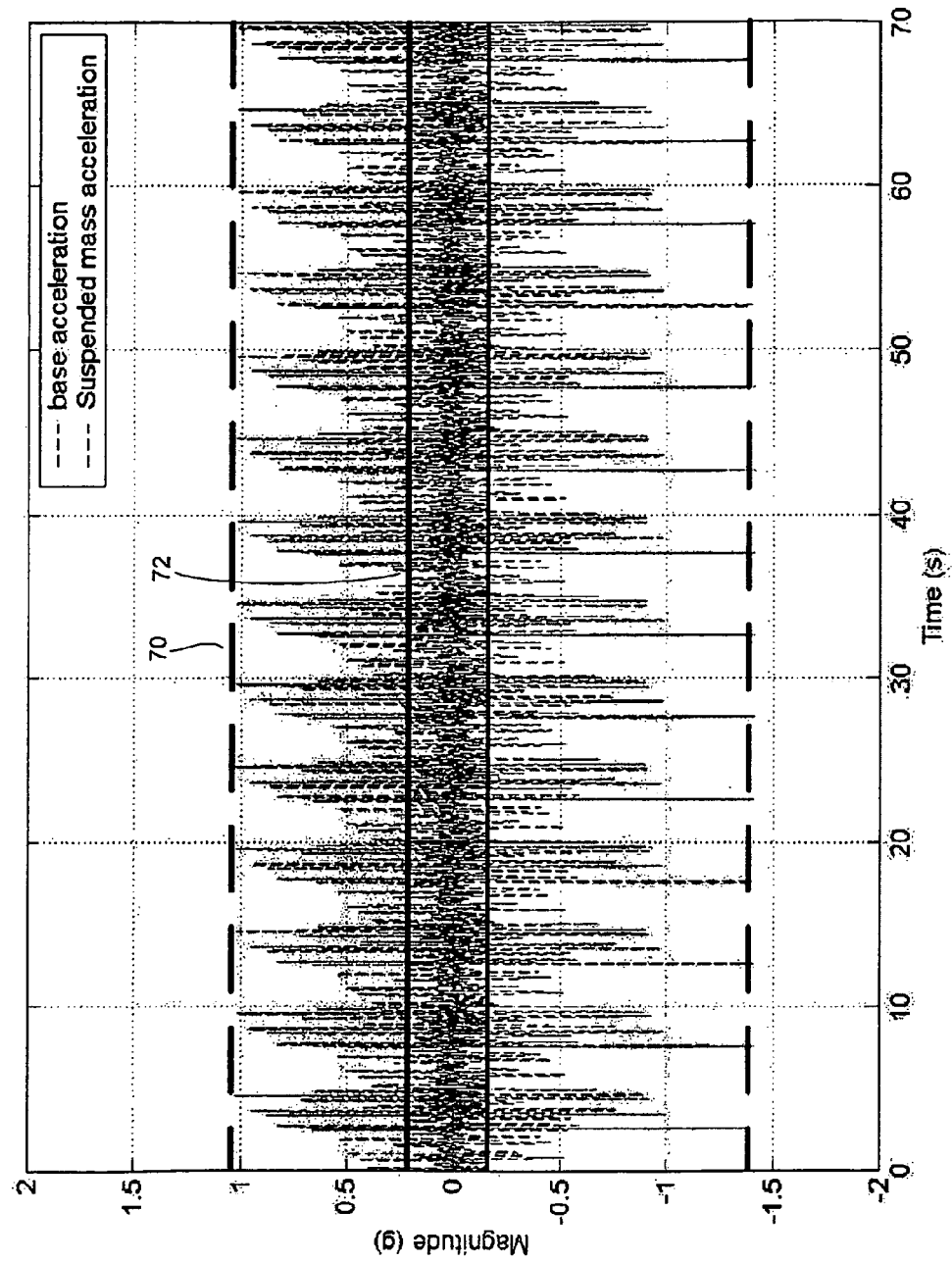
FIG. 8 is a graph illustrating a response of the test system with the accumulated air spring and the catch mechanism.
Figure 9:
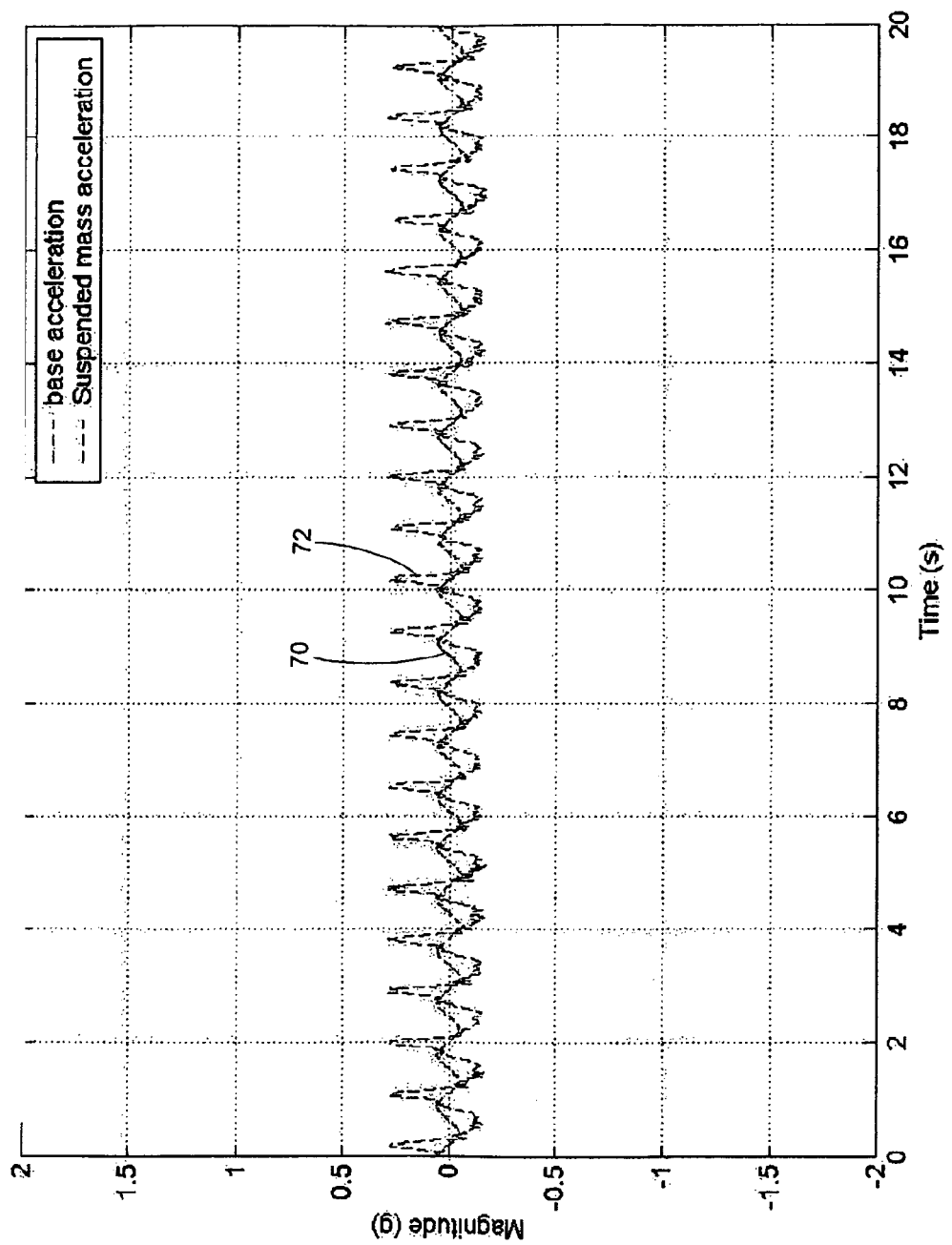
FIG. 9 is a graph illustrating a response of the test system with the accumulated air spring and the catch mechanism for a 1 Hz sine wave vibration profile.
Figure 10:
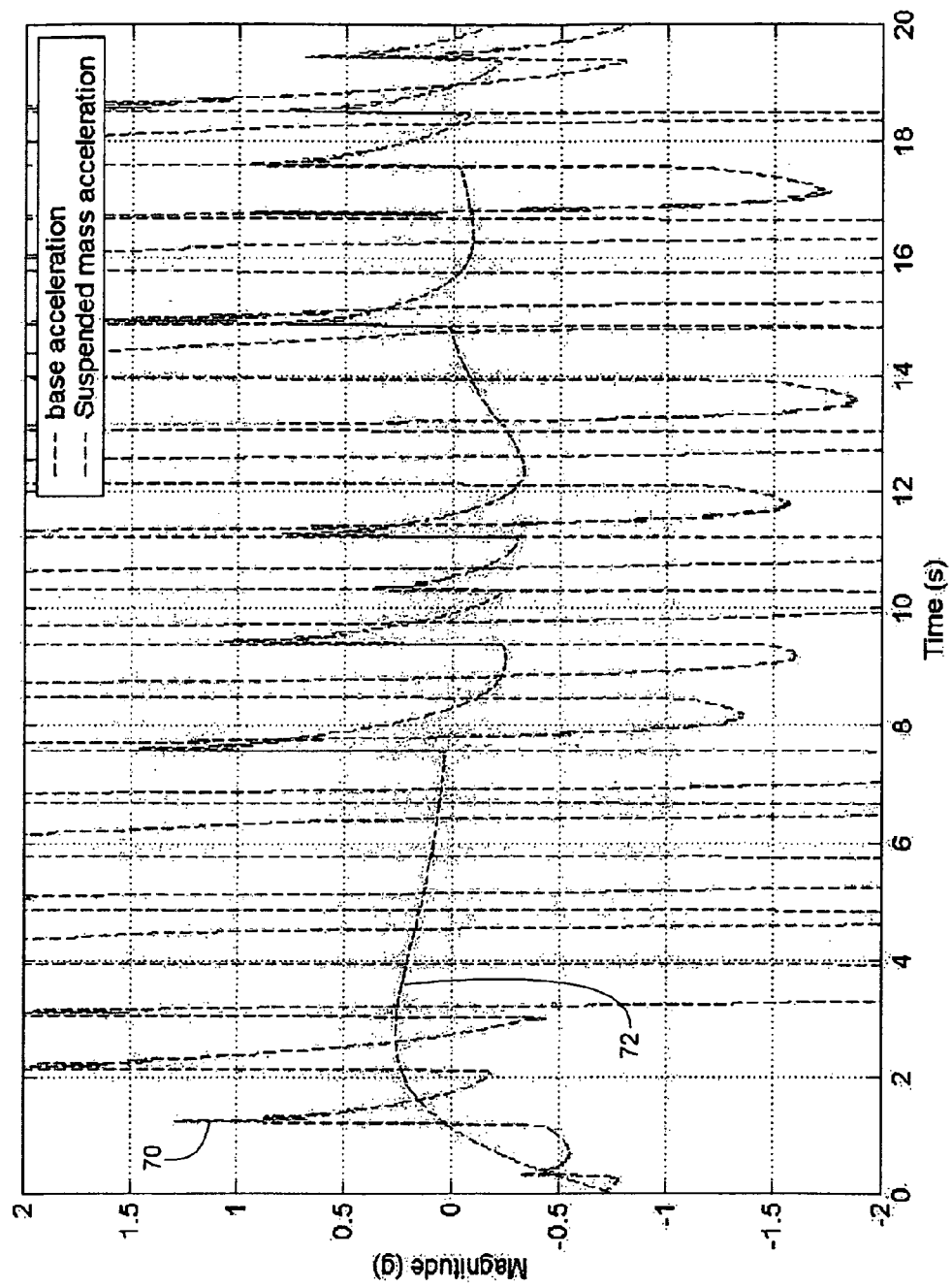
FIG. 10 is a graph illustrating a response of the test system without the accumulated air spring and the catch mechanism for a 1 Hz sine wave vibration profile.

Turning now to FIGS. 6-10, line 70 indicates the peak of the base acceleration of the shaker table (i.e., the unsprung mass connected to the pneumatic vibration isolator via mounting mechanism 20) in FIGS. 6-8 and the base acceleration in FIGS. 9 and 10. Similarly, line 72 indicates the peak of the suspended mass acceleration (connected to the pneumatic vibration isolator via mounting mechanism 18) in FIGS. 6-8 and the suspended mass acceleration in FIGS. 9 and 10.

FIG. 6 illustrates a response with an un-accumulated air spring (i.e., no external volume source connected to air spring) and apparatus non-functional (e.g., no shut-off disk 28 or pneumatic cylinder assembly 52). FIG. 7 illustrates a response with an accumulated air spring and apparatus non-functional. FIG. 8 illustrates a response with an accumulated air spring with apparatus operational. It can be seen that the accumulated air spring reduces the amount of vibration transmitted to the suspended mass. Moreover, the addition of apparatus described herein does not impact adversely the quality of isolation with accumulation when the collapse and over extension modes are not excited.

FIG. 9 illustrates a response with an accumulated air spring with an operational apparatus for a 1 Hz sine wave vibration profile, which is representative of operating near a natural frequency of the test system whereby the collapse and over-extension modes become active. FIG. 10 illustrates a response with the accumulated air spring with deactivated apparatus for the 1 Hz sine wave vibration profile. It can be seen that without the active apparatus the system becomes unstable and the sprung mass is subjected to high g-force impact loads.

From the foregoing, it can be seen that embodiments of the apparatus described herein are devices that incorporate a double acting air cylinder (pneumatic cylinder assembly 52) with an orifice disk 28 attached to the piston 54 shaft end and a sharp edged orifice 32 contained within the air spring head 30. The upper volume 54 of the pneumatic cylinder assembly 52 is vented to the air spring interior compartment 46 through an unrestrictive orifice 58 and the lower volume 60 is vented to the high pressure source 34 through a highly restrictive orifice 62. One function of the pneumatic cylinder assembly 52 is to block air flow to the accumulator 22 when the air spring assembly 24 is attempting to bottom out, thus causing a soft pneumatic stop for the suspended mass 12. A second function of the pneumatic cylinder assembly 52 is to allow the high pressure air within the air spring assembly 24 at its lowest height to be evacuated to the accumulator 22 by pulling the orifice disk 28 from the sharp edged orifice 32, thus precluding a "sling shot" reaction of the suspended mass 12.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pneumatic vibration isolator for isolating vibrations between a sprung mass and an unsprung mass, comprising:
    an air spring assembly having an air spring head defining an orifice therethrough, an air spring sleeve having a first end sealingly coupled to the air spring head and forming an interior air spring compartment therein, and a pneumatic cylinder assembly sealingly coupled to a second end of the air spring sleeve, the pneumatic cylinder assembly including a piston forming a first volume and a second volume therein, the piston having a shaft extending through the pneumatic cylinder assembly along an axis of the orifice of the air spring head and having an orifice disk affixed to an end thereof, the pneumatic cylinder assembly further including a restrictive orifice in fluid communication with the second volume and an unrestrictive orifice in fluid communication with the first volume and with the interior air spring compartment;
    an accumulator in fluid communication with the air spring assembly via the orifice in the air spring head; and
    a high pressure source in fluid communication with the second volume via the restrictive orifice of the pneumatic cylinder assembly.

2. The pneumatic vibration isolator of claim 1, further comprising a first mounting mechanism coupled to the air spring head and adapted to mount to the sprung mass, and a second mounting mechanism coupled to the pneumatic cylinder assembly and adapted to mount to the unsprung mass.

3. The pneumatic vibration isolator of claim 2, wherein the accumulator is coupled to the air spring assembly via a first supply line and wherein the high pressure source is coupled to the pneumatic cylinder assembly via a second supply line, further comprising a height control valve coupled between the first supply line and the second supply line to control a distance between the first mounting mechanism and a second mounting mechanism in a quiescent state.

4. The pneumatic vibration isolator of claim 1, wherein application of a force to the air spring assembly causes movement of the first end toward the second end which results in air within the interior air spring compartment flowing to the accumulator via the orifice in the air spring head until the air spring head contacts the orifice disk which closes off the orifice.

5. The pneumatic vibration isolator of claim 4, wherein removal of the force causes movement of the first end away from the second end which results in air flowing from the accumulator to the interior air spring compartment via the orifice in the air spring head.

6. The pneumatic vibration isolator of claim 4, wherein continued movement of the first end toward the second end after the air spring head contacts the orifice disk causes movement of the piston toward the restrictive orifice and an increase in pressure within the interior air spring compartment, each of which oppose the force causing continued movement of the first end toward the second end.

7. The pneumatic vibration isolator of claim 6, wherein removal of the force causes movement of the first end away from the second end at a first rate and movement of the piston toward the first end at a second rate slower than the first rate which results in the air spring head pulling away from contact with the orifice disk thereby allowing air to flow from the interior air spring compartment via the orifice in the air spring head to the accumulator to slow the first rate.

8. An air spring assembly for use in a pneumatic vibration isolation system, comprising:
    an air spring head defining an orifice therethrough;
    an air spring sleeve having a first end sealingly coupled to the air spring head and forming an interior air spring compartment therein; and
    a pneumatic cylinder assembly sealingly coupled to a second end of the air spring sleeve, the pneumatic cylinder assembly including a piston forming a first volume and a second volume therein, the piston having a shaft extending through the pneumatic cylinder assembly along an axis of the orifice of the air spring head and having an orifice disk affixed to an end thereof, the pneumatic cylinder assembly further including a restrictive orifice in fluid communication with the second volume and an unrestrictive orifice in fluid communication with the first volume and with the interior air spring compartment;
    wherein the orifice disk is positioned a first distance from the orifice in the air spring head such that movement of the first end relative to the second end along the first distance results in air within the interior air spring compartment flowing through the orifice in the air spring head.

9. The air spring assembly of claim 8, wherein movement of the first end toward the second end beyond the first distance results in the air spring head contacting the orifice disk which closes off the orifice and prevents air from flowing therethrough.

10. The air spring assembly of claim 9, wherein continued movement of the first end toward the second end after the air spring head contacts the orifice disk causes movement of the piston toward the restrictive orifice and an increase in pressure within the interior air spring compartment.

11. The air spring assembly of claim 10, a first rate of movement of the piston toward the first end is governed by a rate at which air may flow through the restrictive orifice into the second volume, and wherein movement of the first end away from the second end at a second rate faster than the first rate results in the air spring head pulling away from contact with the orifice disk thereby allowing air to flow through the orifice in the air spring head.

* * * * *